(No Model.)
S. A. BOLLINGER.
Harrow.
No. 228,303.        Patented June 1, 1880.
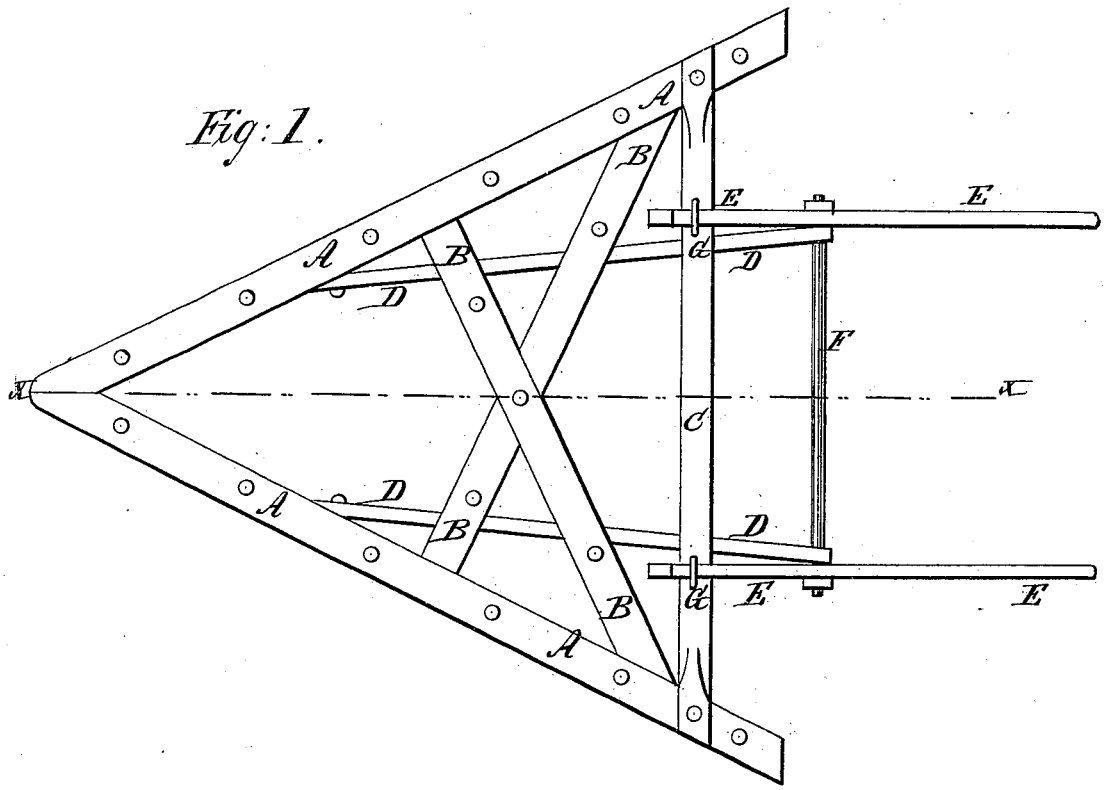
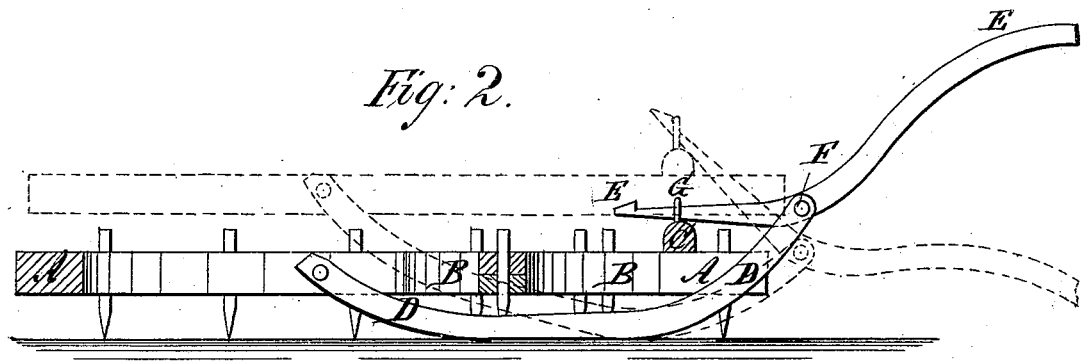
WITNESSES:
A. Schehl.
C. Sedgwick.
INVENTOR:
S. A. Bollinger
BY Munn &Co
ATTORNEYS.

United States Patent Office.

SAMUEL A. BOLLINGER, OF PATTERSON, OHIO.

HARROW.

SPECIFICATION forming part of Letters Patent No. 228,303, dated June 1, 1880.

Application filed March 23, 1880. (No model.)

*To all whom it may concern:*

Be it known that I, SAMUEL A. BOLLINGER, of Patterson, Hardin county, State of Ohio, have invented a new and useful Improvement in Harrows, of which the following is a specification.

Figure 1 is a plan view of the improvement, and Fig. 2 is a sectional side elevation taken through the line $x$ $x$, Fig. 1.

Similar letters of reference indicate corresponding parts.

The object of this invention is to furnish harrows so constructed that either side of the harrow or the whole harrow can be raised from the ground to clear the harrow from rubbish and to pass roots, grass, and other obstructions.

The invention consists in constructing the harrow of a frame, two pivoted runners, two pivoted levers, a pivoting rod or bolt, and two staples or keepers, whereby the harrow-frame can be raised from the ground, as will be hereinafter fully described.

A are the side bars of the harrow-frame, the forward ends of which meet at an acute angle and are secured to each other. The side bars, A, are connected by the cross-bars B, the forward ends of which are attached to the middle parts of the side bars, A.

The bars B cross and are framed to each other, and their rear ends are attached to the rear ends of the side bars, A. The rear ends of the side bars, A, are also connected by a cross-bar, C.

To the forward parts of the side bars, A, are pivoted the forward ends of the runners D, which are curved upward at both ends. The rear ends of the runners D are pivoted to the levers E by a bolt or rod, F.

The forward ends of the levers E pass through staples or keepers G, attached to the cross-bar C, and have shoulders or hooks formed upon them to prevent the said levers from being drawn out of the said staples or keepers. The rear parts of the levers E are curved upward and rearward, as shown in Fig. 2.

With this construction, by bearing down upon either of the levers E either side of the harrow can be raised from the ground, and by bearing down upon both levers the entire harrow can be raised from the ground, the runners D sliding over the rubbish and drawing it off the harrow-teeth.

I have shown and described the improvement as being applied to a V-shaped harrow; but it may be applied to a square harrow or a harrow of any other shape with equal facility and advantage.

Having thus described my invention, I claim as new and desire to secure by Letters Patent—

1. A harrow, constructed substantially as herein shown and described, consisting of the frame A B C, the pivoted runners D, the pivoted levers E, the pivoting bolt or rod F, and the staples or keepers G, whereby the harrow-frame can be raised from the ground, as set forth.

2. In a harrow, the combination, with the harrow-frame, of the pivoted runners D, the pivoted levers E, the pivoting bolt or rod F, and the staples or keepers G, substantially as herein shown and described, whereby either side of the harrow-frame or the entire frame can be raised from the ground, as set forth.

SAMUEL ANDERSON BOLLINGER.

Witnesses:
 WM. T. CESSNA,
 SAMUEL L. WEBB.